3,764,388
CHLORIDE FREE AMALGAMATION OF ZINC POWDER USING ACETIC, OXALIC AND BORIC ACIDS
Nikola Marincic, Winchester, Mass., assignor to P. R. Mallory & Co., Inc., Indianapolis, Ind.
No Drawing. Filed Feb. 9, 1971, Ser. No. 114,090
Int. Cl. H01m 43/02
U.S. Cl. 136—31
8 Claims

ABSTRACT OF THE DISCLOSURE

A porous zinc anode produced and adapted for use in alkaline solution, said anode in said solution constituting means for obviating gassing characteristics as contrasted to a porous zinc anode produced in other ways. The essential step in the invention is free acid amalgamation with an acid other than hydrochloric acid in order to form a water soluble salt of the free acid.

---

This invention relates to batteries and more particularly to improved structures and systems therefor, and specifically to the electrodes used therein.

The efficiency of a battery depends to a great extent on the surface area of the anode structure used therein. The present invention provides an anode of greatly improved characteristics comprising compacted porous zinc amalgam, and utilizing an aqueous solution of acetic acid to form said zinc amalgam by electrochemical reaction cementation.

The reactive cementation process utilizes the electrochemical reaction of mercuric salts and metallic zinc to produce an alloying or amalgam. In order to facilitate the process of amalgamation of zinc powder with metallic mercury, however, a free acid other than hydrochloric acid is used as a fluxing agent for the zinc particles to facilitate their intimate contact with metallic mercury. An example of such a free acid is acetic acid which has the property of producing exceptionally clean and active amalgamated zinc powder for the application of producing high rate anodes.

In the past zinc electrodes were produced by compacting zinc amalgam which was made by utilizing ammonium chloride solution to form an intimate contact between zinc particles and metallic mercury or to facilitate the electrochemical displacement of mercury from the mercurous chloride compound by metallic zinc.

It was found that gassing may occur from zinc anodes produced by the ammonium chloride process, with the instability toward gassing being due to the presence of zinc oxide and/or zinc chloride impurity sites on the zinc anode.

Furthermore in the past it was thought that a way to avoid gassing would be to have zinc mercury amalgam spread over substantially the entire anode surface. Nevertheless gassing still may result even with a complete amalgam coating. It has been found here, that if a chloride free acid is used as a fluxing agent for the zinc particles so as to facilitate their intimate contact with metallic mercury and also to deposit trace amounts of inert acetate ions integrally united to the zinc at specific lattice sites; then it is possible to prevent gassing at those sites caused by zinc oxide or zinc chloride that would otherwise be present therein. These ions are inert because they do not directly or indirectly cause anode gassing to occur.

It is therefore a prime object of the present invention to provide, in a battery, an amalgamated zinc anode of uniform density characterized by substantially reduced gassing in the finished anode.

It is another object of the present invention to provide an improved anode forming powder for a battery anode electrode having reduced gassing of the finished powder, having increased high rate discharge capabilities of the finished anodes produced with this powder, having a simplified production procedure with fewer rinsing cycles required after the amalgamation step, and having reduced costs in terms of materials and time.

It is another object of the present invention to provide an anode structure for an electrical device, said structure formed by mixing specific portions of zinc powder and mercury into an aqueous solution of acetic acid, then blending and reactively cementing and washing said portions.

It is a further object of the present invention to produce a porous anode structure of specific shape in the form of a selfsupporting open three dimensional zinc mercury metal network consisting essentially of chloride free zinc and mercury amalgam particles which are pressure welded one to another having communicating voids therebetween and further consisting of trace amounts up to 1% by weight of said structure of chloride free ions integrally united at specific lattice sites to reduce anode gassing.

Still another object of the present invention is to provide a primary cell including a zinc amalgam porous anode for a battery.

Another object is to provide a porous pellet, of homogenized and uniform density, formed primarily as a zinc amalgam structure.

Other objects of the invention will become apparent from the following description.

Generally speaking, the present invention provides a new battery system in which the problem of anode gassing is substantially reduced. The substantial reduction is the direct result of the presence, in the battery, of a novel anode consisting of porous zinc mercury amalgam containing trace amounts of the chloride free acetate ions of up to 1% in weight. The anode is formed by compacting zinc amalgam powder formed in the reaction of admixed materials such as zinc powder and mercury metal in an aqueous solution of acetic acid, free from any chloride ions. It will be clear to those skilled in the art that mercuric oxide or other chloride free mercuric or mercurous compounds may be substituted for the metallic mercury. The anode so prepared will have a final composition of about 85% zinc and 15% mercury.

It was observed during the development of the chloride free amalgamation process for sintered zinc anode that the zinc particles became bright and clean in as little as 0.5% acetic acid and tended to sinter. This concentration of acetic acid was found sufficient to clean the zinc particles and to permit the amalgamation with metallic mercury. Acetic acid concentrations may range between 0.5% to 50% by weight of the aqueous solution, with the preferred range being 0.5–10%. The essential determining factor is that sufficient hydrogen ion concentration exists necessary to clean from the zinc powder particles the oxide layer and any impurities present thereon.

The resulting porous anode structure is of specific shape in the form of a selfsupporting open three dimensional zinc mercury metal network consisting essentially of chloride free amalgamated zinc particles pressure welded one to another and having communicating voids between. This porous structure also consists of trace amounts of chloride free acetate ions integrally united at specific lattice sites to reduce anode gassing.

EXAMPLE (A) 15 gallons of deionized water were mixed with 1.5 gallons of 56% acetic acid in the blender for one to two minutes.

(B) 405 pounds of zinc powder was added into the blender and the blender was operated for another two minutes.

(C) 45 pounds of mercury was added by a slow pouring without discontinuing the blender operation.

(D) The blender was operated for another 25 to 30 minutes after the addition of mercury.

(E) The solution was drained at the end of the blending period; the blender was filled with deionized water and operated for 5 minutes; and the liquid was drained again. The washing cycle was repeated four times. The pH of the solution was checked before the draining after the fourth washing using color indicator paper. The washing was considered completed if the pH was 6 or between 6 and 7. If the pH was lower than 6 at this point, one additional (i.e.—fifth) washing was sufficient to complete the washing operation.

(F) The wet powder was transferred into a rotary vacuum filtering drum and put under a (reduced pressure) of about 10 inches Hg for final washings with alcohol. Two alcohol washings were applied within 10 minute intervals for optimum removal of the aqueous liquid from the powder.

(G) The powder was dried for 30 minutes in a vacuum oven at 80° F. under a pressure of about 10 inches Hg.

From a batch of the larger sized particles, 25 to 40 microns a 2.0 gram pellet was pressure welded together in a 0.5 inch diameter die with a force of 1600 pounds. The pellet was then inserted as an anode into an alkaline cell of flat cylindrical construction in contact with an absorbent spacer impregnated with an alkaline electrolyte, such as 35–40% KOH, 3.5–6.5% ZnO, and the balance water. In contact with the opposite surface of said spacer was a suitable depolarizer such as the metal oxide HgO, $MnO_2$, or $Ag_2O$ containing from 5–25% graphite. This sealed cell was subjected to 180° F. for 24 hours with the result the 0.04 cu. cm. of gas was produced.

When 2.0 grams of the smaller sized particles were tested 6 to 12 microns as set forth above, the result was 0.1 cu. cm. of gas.

The difference between these two volumes of gas produced can be ascribed to the difference in the particle size of the powder used. The smaller sized particles consist of greater total surface area and this apparently causes the greater volume of gas to be generated.

When zinc particles of the same range of sizes were produced by the use of ammonium chloride, the gassing rate was determined to be 0.20 cu. cm. to 0.25 cu. cm. for a 24 hour period.

Tests were run utilizing the above procedures except that the chloride free acid was either oxalic acid or was boric acid. The results of these tests were 0.04 cu. cm. to 0.10 cu. cm. of gas for 24 hours at 180° F. for the chloride free process; versus 0.20 cu. cm. to 0.25 cu. cm. for 24 hours at 180° F. when ammonium chloride was used.

Thus both figures for the chloride free amalgamation are very satisfactory relative to the figures obtained by testing the zinc powder produced by the chloride process and indicate the great superiority of the present invention over conventional anode structures.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

What is claimed is:

1. A reactive mixture for fabricating a highly porous amalgamated chloride free zinc anode for a current producing device, said mixture consisting essentially of zinc powder, mercury metal, and a liquid solution consisting essentially of a chloride free acid dissolved in water, said acid selected from the group consisting of acetic, oxalic, and boric acids.

2. The reactive mixture of claim 1 wherein said acid ranges between 5–10% by weight of said solution.

3. The reactive mixture of claim 1 wherein said metallic mercury is replaced by a mercury salt selected from the group consisting of chloride free mercurous and mercuric compounds.

4. The reactive mixture of claim 1 wherein said mercury salt consists of mercuric oxide.

5. A method of fabricating a highly porous amalgamated chloride free zinc anode for an electric current producing device comprising the steps of: preparing a liquid solution consisting essentially of a chloride free acid dissolved in water, said acid selected from the group consisting of acetic, oxalic, and boric acids; adding zinc powder to said solution; and adding mercury metal to said solution to produce a chloride free mercury zinc amalgam.

6. The method of claim 5 wherein said zinc powder and said mercury metal are added simultaneously to said solution.

7. The method of claim 5 further comprising the steps of washing said amalgam with deionized water until the wash solution effluent has a pH at least 6; washing said amalgam with alcohol under reduced presure; and drying said amalgam under vacuum.

8. The method of claim 7 wherein said chloride free amalgam contains trace amounts of inert acetate ions present up to 1% by weight of said amalgam and integrally united at specific lattice sites to substantially reduce the anode gassing rate down to 0.04 to 0.10 cubic centimeter per 24 hours.

References Cited
UNITED STATES PATENTS

| | | | |
|---|---|---|---|
| 413,438 | 10/1889 | Eggers | 75—169 |
| 2,938,064 | 5/1960 | Kordesch | 136—125 |
| 3,071,638 | 1/1963 | Clark et al. | 136—125 |
| 3,130,044 | 4/1964 | Flindt | 75—169 |
| 3,565,695 | 2/1971 | Jerabek | 136—31 |

ALLEN B. CURTIS, Primary Examiner

C. F. LEFEVOUR, Assistant Examiner

U.S. Cl. X.R.

75—178 R